US010414500B2

(12) United States Patent
Irons et al.

(10) Patent No.: US 10,414,500 B2
(45) Date of Patent: Sep. 17, 2019

(54) ELECTRONIC DEVICE HOLDERS

(71) Applicant: Ford Global Technologies LLC, Dearborn, MI (US)

(72) Inventors: Andrew Kevin Irons, Essendon (AU); Shayne Ellis, Gladstone Park (AU); Nick David Eterovic, Brunswick West (AU); Ian Woodward, Monbulk (AU)

(73) Assignee: Ford Global Technologies LLC, Dearborn, MI (US)

( * ) Notice: Subject to any disclaimer, the term of this patent is extended or adjusted under 35 U.S.C. 154(b) by 168 days.

(21) Appl. No.: 15/679,437

(22) Filed: Aug. 17, 2017

(65) Prior Publication Data
US 2018/0072424 A1 Mar. 15, 2018

(30) Foreign Application Priority Data

Sep. 14, 2016 (CN) .......................... 2016 1 0825861

(51) Int. Cl.
B60R 7/04 (2006.01)
B60R 11/02 (2006.01)
(Continued)

(52) U.S. Cl.
CPC ........ B64D 11/00152 (2014.12); B60R 7/043 (2013.01); B60R 11/0252 (2013.01);
(Continued)

(58) Field of Classification Search
CPC ................. B60R 7/043; B60R 11/0252; B60R 2011/0012; B60R 2011/0015;
(Continued)

(56) References Cited

U.S. PATENT DOCUMENTS 8,474,778 B2    7/2013   Jacobson
9,296,325 B2    3/2016   Kim et al.
(Continued)

FOREIGN PATENT DOCUMENTS

EP    2746158 A1 *  6/2014  ............. B64D 11/06
FR    2965768 A1 *  4/2012  ............. B60R 11/02
(Continued)

OTHER PUBLICATIONS

Machine Translation of EP 2 746 158 A1, http://translationportal.epo.org/emtp/translate/?ACTION=description-retrieval&COUNTRY=EP&ENGINE=google&FORMAT=docdb&KIND=A1&LOCALE=en_EP&NUMBER=2746158&OPS=ops.epo.org/3.2&SRCLANG=de&TRGLANG=en; Apr. 30, 2019 (Year: 2019).*
(Continued)

Primary Examiner — Ryan D Kwiecinski
(74) Attorney, Agent, or Firm — Vichit Chea; Kolitch Romano LLP

(57) ABSTRACT

An electronic device holder disposed on a seat back comprises a base fixed to the seat back; a folding shelf rotatably attached to the base via first and second pivot members and configured to be rotated between a stowed position and a use position; and a sliding member attached to the base and configured to be moved upward and downward. The folding shelf includes an upper surface; and a plurality of retaining lips extending from the upper surface to form a plurality of recesses. The folding shelf and the sliding member form an angle in the use position so as to hold an electronic device between one of the recesses and a free end of the sliding member in the use position.

18 Claims, 14 Drawing Sheets

(51) Int. Cl.
    *B64D 11/00*    (2006.01)
    *B60R 11/00*    (2006.01)
    *B60N 2/90*    (2018.01)

(52) U.S. Cl.
    CPC . *B60N 2002/905* (2018.02); *B60R 2011/0015* (2013.01); *B60R 2011/0071* (2013.01); *B60R 2011/0075* (2013.01); *B60R 2011/0082* (2013.01); *B60R 2011/0085* (2013.01); *B60R 2011/0276* (2013.01)

(58) Field of Classification Search
    CPC ..... B60R 2011/0071; B60R 2011/0075; B60R 2011/0082; B60R 2011/0085; B60R 2011/0276; B64D 11/00152; B60N 2002/905
    See application file for complete search history.

(56) References Cited

U.S. PATENT DOCUMENTS

| | | | |
|---|---|---|---|
| 9,776,722 B2 * | 10/2017 | Pozzi | B64D 11/00152 |
| 2004/0239155 A1 * | 12/2004 | Fourrey | B60N 2/206 297/163 |
| 2011/0155024 A1 * | 6/2011 | McCaffrey | B60N 3/004 108/26 |
| 2014/0268544 A1 | 9/2014 | Johnson | |
| 2014/0354002 A1 * | 12/2014 | Bisceglia | B60R 11/02 296/37.12 |
| 2015/0274081 A1 | 10/2015 | Fan | |
| 2018/0065567 A1 * | 3/2018 | Osterhoff | B60N 2/90 |
| 2018/0345874 A1 * | 12/2018 | Thain | B60R 11/0241 |
| 2018/0356030 A1 * | 12/2018 | Channon | F16M 13/022 |

FOREIGN PATENT DOCUMENTS

| | | | | |
|---|---|---|---|---|
| FR | 2982218 A1 * | 5/2013 | | B60N 3/004 |
| JP | 2012105752 A * | 6/2012 | | B60R 11/02 |
| WO | 2015010123 A1 | 1/2015 | | |

OTHER PUBLICATIONS

Headrest Tablet Holder by iPADKET—May 25, 2011; https://thegadgetflow.com/portfolio/headrest-tablet-holder-ipadket/.

* cited by examiner

ELECTRONIC DEVICE HOLDERS

RELATED APPLICATION

This application claims the benefit of Chinese Patent Application No.: CN 201610825861.2 filed on Sep. 14, 2016, the entire contents thereof being incorporated herein by reference.

FIELD

The present disclosure relates generally to electronic device holders, in particular, electronic device holders for holding and displaying electronic devices on the back of a seat.

BACKGROUND

Known electronic device holders are not entirely satisfactory for the range of applications in which they are employed. For example, conventional electronic device holders may not be suitable for use on a seat back. Specifically, they may not be securable to the seat back and/or they may not be sufficiently compact to fit with the space confined between rows of seats. In addition, conventional electronic device holders may not be capable of holding a variety of different sizes of electronic devices. Furthermore, conventional device holders may not provide a means to adjust the viewing angle of the electronic device being held.

The inventor has recognized that conventional electronic device holders may not adequately hold a variety of electronic devices, adjust viewing angle and stow compactly when not in use. Thus, there exists a need for electronic device holders that improve upon and advance the design of known device holders. Examples of new and useful electronic device holders relevant to the needs existing in the field are discussed below.

SUMMARY

According to one aspect, an electronic device holder is provided. The electronic device holder may be disposed on a seat back and comprise a base fixed to the seat back; a folding shelf rotatably attached to the base via first and second pivot members and configured to be rotated between a stowed position and a use position; and a sliding member attached to the base and configured to be moved upward and downward. The folding shelf includes an upper surface; and a plurality of retaining lips extending from the upper surface to form a plurality of recesses. The folding shelf and the sliding member form an angle in the use position.

In one embodiment, the sliding member may include an upper flange at a free end and extending from a main surface of the sliding member. The base may include a main body having two side walls and a rail above the main body. The folding shelf may be attached to the two sidewalls of the base, respectively. The sliding member may be configured to move inside the rail.

In another embodiment, the first pivot member may include two gears that engage with each other to provide an amount of resistance to damp motion of the folding shelf, and the second pivot member may include a pin and a spring.

In another embodiment, the electronic device holder may further comprise a rack gear attached to the sliding member; and a pinion gear engaged with the rack gear and attached to the base. A force applied by a user may move the sliding member upward and downward while the rack gear and the pinion gear are engaged, and the sliding member may be secured at a specific position when the force is released.

In another embodiment, the electronic device holder may comprise a latch configured to selectively prevent rotation of the pinion gear.

In another embodiment, the sliding member may include a telescopic pole having a first part connected to a first end portion of the sliding member and a second part connected to the base. The first part is configured to move inside the second part so that the sliding member is extended and retracted to vary a distance between the sliding member and the folding shelf.

In another embodiment, the electronic device holder may further comprise a spring having a first end attached to the base and a second end attached to the sliding member. The sliding member is automatically retracted to the stowed position by a spring force when the upper flange is moved away from the electronic device.

In another embodiment, the base may include a main body and a rail disposed above the main body. The main body may include two side walls substantially parallel to a length-wise direction of the sliding member and the folding shelf is attached to the two sidewalls, respectively. The sliding member may include an upper flange at a free end and extending from a main surface of the sliding member and sliding grooves at two side of the sliding member. The sliding grooves may surround the rail to guide the sliding member to move along the rail.

In another embodiment, the electronic device holder may further comprise a gear and a rack gear engaging the gear. The gear may be attached to the folding shelf and the rack gear may be attached to the sliding member. The movement of the sliding member causes rotation of the folding shelf such that the folding shelf is placed in the use position or the stowed position.

In another embodiment, the electronic device may further comprise a coil spring attached to the rail and the sliding member, respectively. The coil spring may be disposed adjacent to a top end of the rail and configured to provide a tension to move the sliding member downward.

In another embodiment, the base may be a part of a seat structure associated with the seat back.

In another embodiment, the electronic device holder may comprise an attachment mechanism configured to attach the electronic device holder to the seat back.

In another embodiment, the folding shelf may be made of non-slip material.

According to another aspect, a seat assembly comprises a seat having a seat back; a base attached to the seat back, wherein the base includes a main body having two sidewalls substantially parallel to a back surface of the seat and in a substantially upright position and a rail above the main body; a folding shelf rotatably attached to the sidewalls of the base via a first pivot member and a second pivot member such that the folding self is capable of up to a stowed position and down to a use position. The folding shelf includes an upper surface and a plurality of retaining lips extending from the upper surface to form a plurality of recesses; and a sliding member including a body and an upper flange extending from the body at a free end and slidably attached to the base, and wherein the sliding member and the folding shelf form an angle at the use position so as to hold an electronic device between one of the recesses and a free end of the sliding member in the use position.

In one embodiment, the electronic device holder may further comprise a gear and a rack gear engaging the gear. The gear is attached to the folding shelf and the rack gear is attached to the sliding member, and movement of the sliding member causes rotation of the folding shelf such that the folding shelf is placed in the use position or the stowed position.

In another embodiment, the electronic device may further comprise a coil spring attached to the rail and the sliding member, respectively. The coil spring may be disposed adjacent to a top end of the rail and configured to provide a tension to move the sliding member downward.

In another embodiment, the seat assembly may further comprise a damped gear mechanism engaged with the first pivot member.

In another embodiment, the seat assembly may further comprise a rack gear attached to the sliding member; and a pinion gear rotatably engaged with the rack gear and attached to the base, wherein the rack gear is movable up and down along with the sliding member.

In another embodiment, the base is a part of a trim of a seat structure.

In another embodiment, at the stowed position, the upper flange may be substantially parallel to a top of the seat back and a free end of the folding shelf contacts the upper flange.

DETAILED DESCRIPTION

The disclosed electronic device holders will become better understood through review of the following detailed description in conjunction with the figures. The detailed description and figures merely provide examples of the various inventions described herein. Those skilled in the art will understand that the disclosed examples may be varied, modified, and altered without departing from the scope of the inventions described herein. Many variations are contemplated for different applications and design considerations; however, for the sake of brevity, each and every contemplated variation is not individually described in the following detailed description.

Throughout the following detailed description, examples of various electronic device holders are provided. Related features in the examples may be identical, similar, or dissimilar in different examples. For the sake of brevity, related features will not be redundantly explained in each example. Instead, the use of related feature names will cue the reader that the feature with a related feature name may be similar to the related feature in an example explained previously. Features specific to a given example will be described in that particular example. The reader should understand that a given feature need not be the same or similar to the specific portrayal of a related feature in any given figure or example.

With reference to FIGS. 1-7, an example of an electronic device holder 10 will now be described. The electronic device holder 10 functions to hold a variety of electronic devices for a user to view a display of the electronic devices. The reader will appreciate from the figures and description below that the device holder 10 addresses shortcomings of conventional device holders.

For example, the device holder 10 is configured to hold a variety of electronic devices of different shapes and sizes. Further, the device holder 10 may be used to adjust a viewing angle of an electronic device. Finally, the device holder 10 may be stowed compactly when not in use. The device holder 10 may be useful in the seats in automobiles, trains, movie theaters or other locations that include multiple rows of seats.

Figure 6:
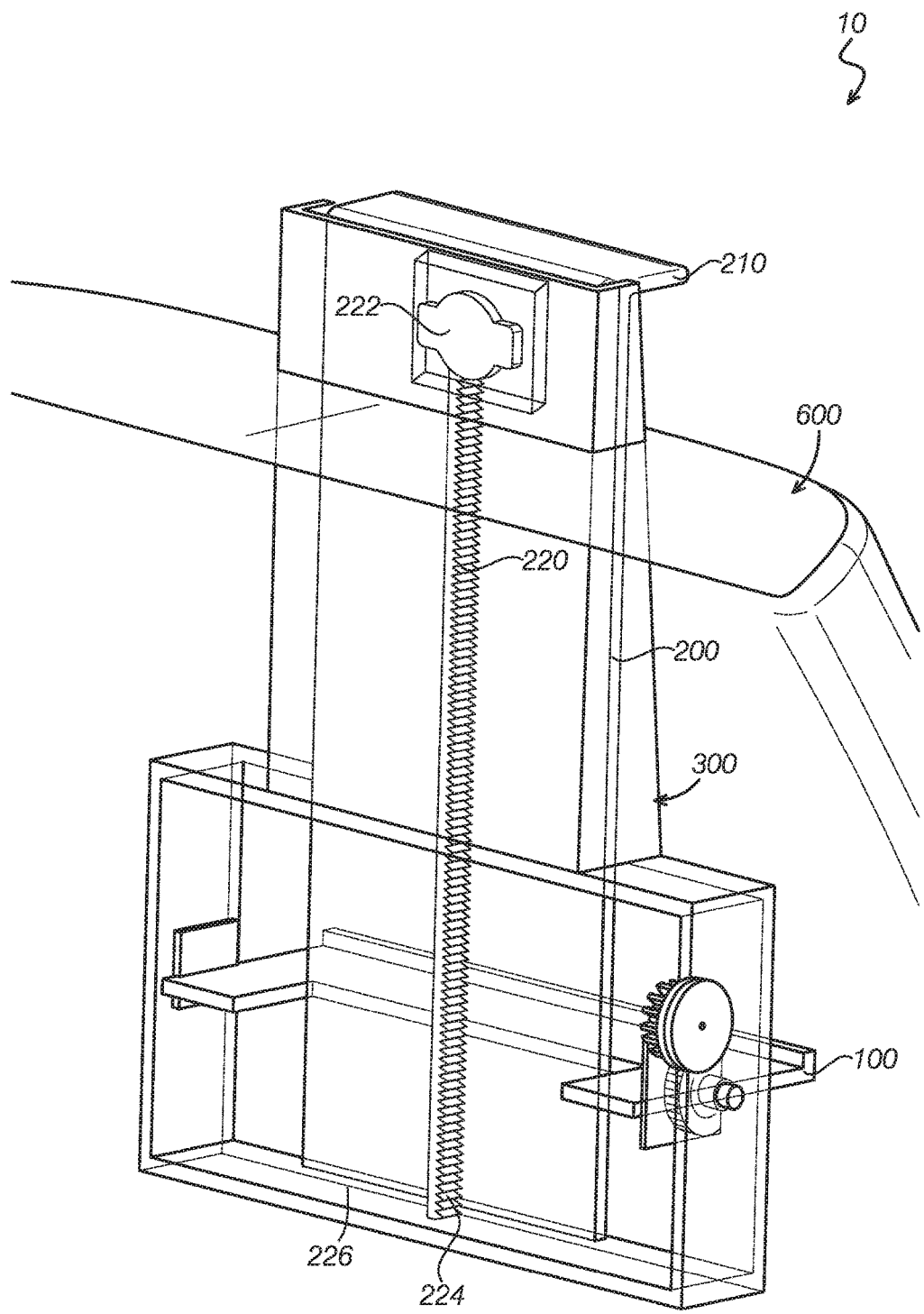
FIG. 6 is a perspective view of the electronic device holder from a different angle from FIGS. 3-5, schematically illustrating the connection between the base and the sliding member as well as the connection between the base and the folding shelf; and showing the sliding member in a retracted position.
Figure 7:
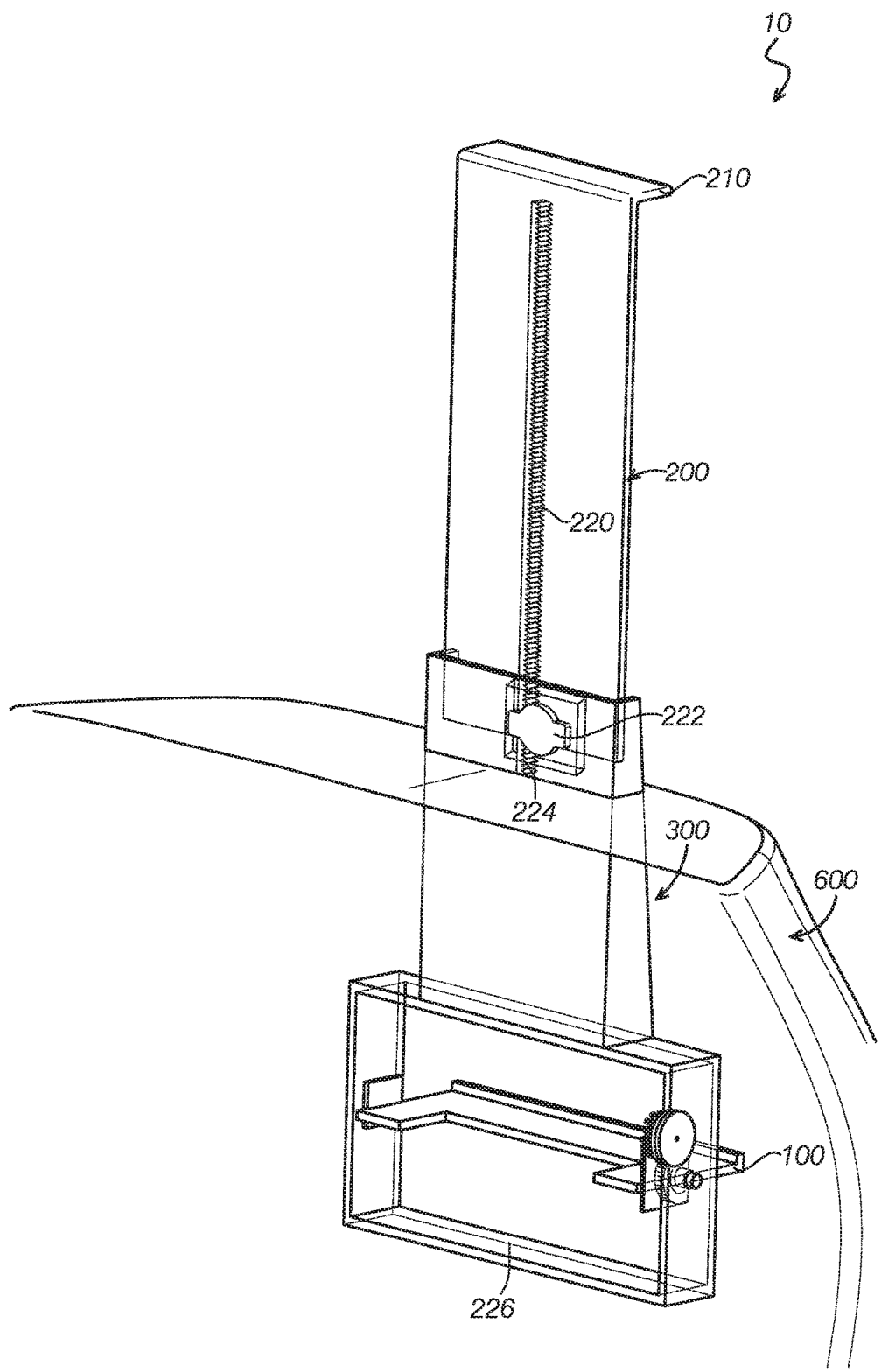
FIG. 7 is a detailed perspective view of the electronic device holder from the same angle as FIG. 6, schematically illustrating the connection between the base and the sliding member as well as the connection between the base and the folding shelf, and showing the sliding member in an extended position.

Referring FIGS. 6 and 7, device holder 10 includes a base 300, a folding shelf 100 and a sliding member 200 which are all connected base 300. The sliding member 200 includes an upper flange 210. The upper flange 210 may extend from a main surface of the sliding member 200.

In some embodiments, the device holder 10 may be integral to a seat back 600. In other embodiments, the device holder 10 may be attached to the seat back 600. In some embodiments, an upper surface of the folding shelf 100 may include one or more retaining lips 110 (see FIGS. 2A and 2B). The folding shelf 100 may be rotatably attached to the base via first and second pivot members 310 and 311 as described in detail below.

Figure 1:
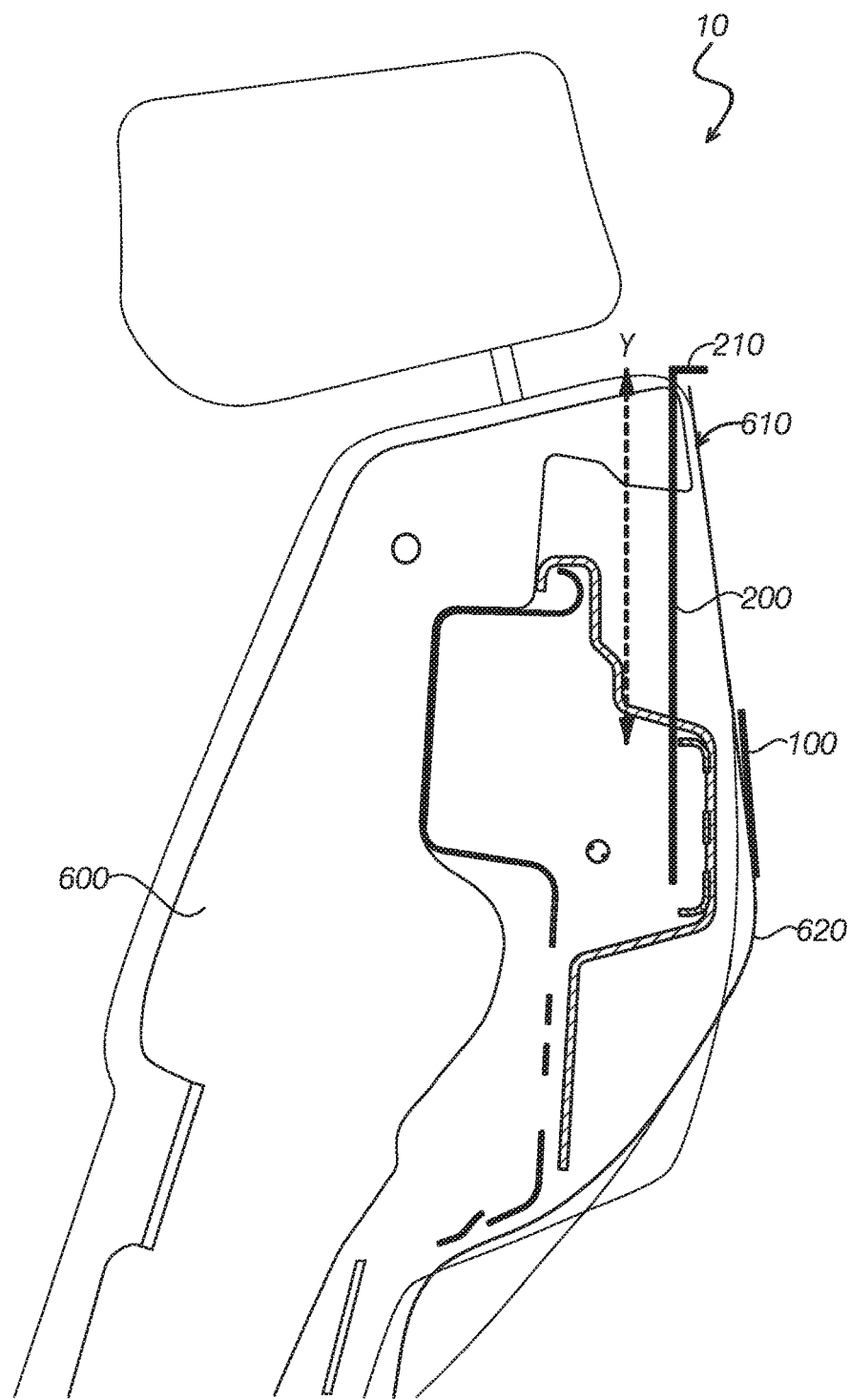
FIG. 1 is a side schematic view of a first example of an electronic device holder.

Turning now to FIG. 1, a schematic view of the device holder 10 is shown. The device holder 10 is shown to be attached to a seat 600. The seat 600 may be a front seat and the presence of the device holder 10 allows an occupant in a back seat to place a device such as an electronic device in the device holder 10 so that the occupant can view the content of the device. In some embodiments, the device holder 10 may be integrated with a seat 600. In the depicted embodiment, the folding shelf 100 is disposed on a rear surface 620 of a seat back 610. FIG. 1 shows the folding shelf 100 in a stowed position. In some embodiments, the folding shelf 100 may be substantially upright in the stowed position. In some embodiment, a surface of folding shelf 100 may be substantially aligned with a rear surface 610 of the seat back 600.

FIG. 1 shows that the sliding member 200 is in a retracted position. The sliding member 200 may be disposed along a height direction of the seat 600. In some embodiments, the sliding member 200 may be substantially disposed inside the seat 600 in a retracted position. The sliding member 200 may include an upper flange 210. In some embodiments, the upper flange 210 may be gripped by a user to move the sliding member up along a Y axis to a use position for holding the device and to move sliding member 200 down to return to the retracted position. As can be seen, the sliding member 200 may be substantially stored within the seat 600 when in the retracted position. In this regard, the device holder 10 may be stored compactly, within the seat 600.

Figure 2A:
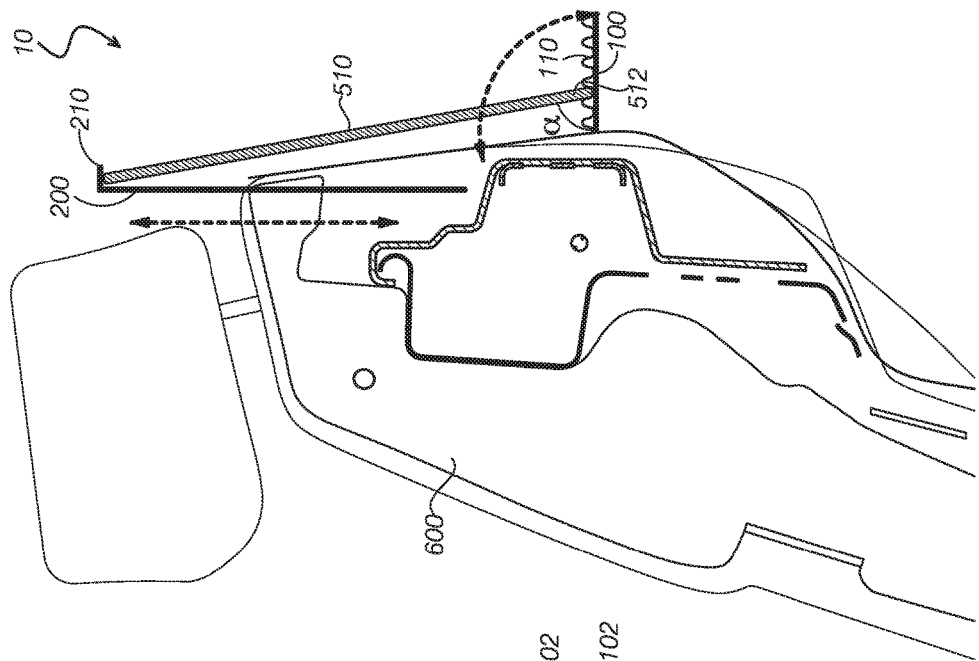
FIG. 2A is a side schematic view of the electronic device holder of FIG. 1, showing the shelf and sliding member holding a first electronic device.
Figure 2B:
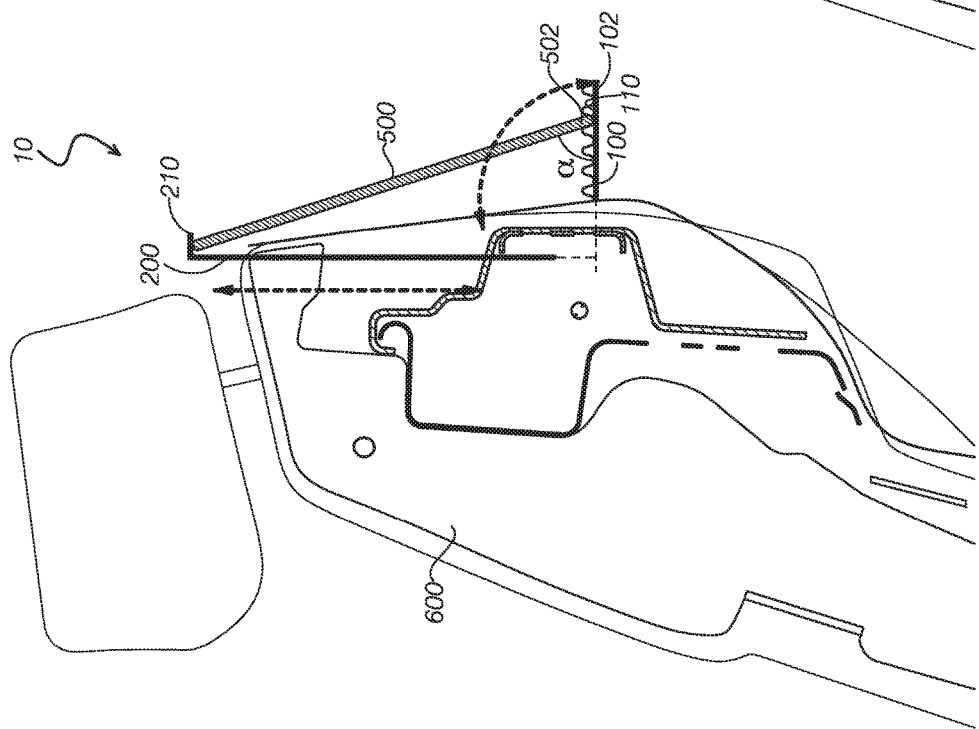
FIG. 2B is a side schematic view of the electronic device holder of FIG. 1, showing the shelf and sliding member holding a second electronic device.

Turning now to FIG. 2A, a side schematic view of the electronic device holder 10 is shown to illustrate the electronic device holder 10 holding an electronic device 500. The electronic device 500 may be a smart phone, a tablet or any device that an occupant behind a seat back may view the content the display and interact with a user interface of the electronic device. As can be seen in FIG. 2B, the folding shelf 100 may be rotated downward to a use position. In some embodiments, the folding shelf 100 may have a corrugated surface. In some embodiments, the folding shelf 100 may include a corrugated surface or a plurality of retaining lips 110 that form a plurality of recesses. In the use position, the sliding member 200 and the folding shelf 100 form an angle such that the electronic device 500 can be held. Furthermore, the sliding member 200 may be extended upward by pulling the top or the upper flange 210 of the sliding member 200. The bottom edge 502 of the electronic device 500 may be placed against one of the retaining lips 110 or placed into one of the recesses. The upper flange 210 may then be engaged with the top edge of the electronic device 500. Thus, the electronic device 500 may be secured in place for use by an occupant located behind the seat back. The electronic device 500 may form a holding angle α with a surface of the folding shelf 100. Holding angle α varies as the bottom edge 502 is placed into different recesses so that the electronic device 500 may be located in a position to provide a comfortable viewing angle to the occupant sitting behind the seat 600 and may further compensate variation in the seatback angle. Further, the size of the electronic device 500 may be accommodated by adjusting position of the bottom edge 502 on the folding shelf 500. For example, as the angle α decreases, an electronic device with a greater size in a lengthwise direction can be held. That is, a bottom edge of a larger electronic device may be placed in a recess adjacent to a free end 102 of the folding shelf 100 to receive a larger size electronic device.

The adjustment on the length of the sliding member 200 may further accommodate the size of electronic device and provide a desired viewing angle. FIG. 2B is a side schematic view of the electronic device holder of FIG. 1, showing the folding shelf and sliding member holding a second electronic device 510. As can be seen in FIG. 2B, the device holder 10 may also be used with a device 510 of a different size than that of the electronic device 500. As shown, the sliding member 200 may be extended further to accommodate a taller device. Furthermore, the viewing angle of the device may be adjusted by placing the bottom edge 512 of the electronic device against a different one of the plurality of retaining lips.

Figure 3:
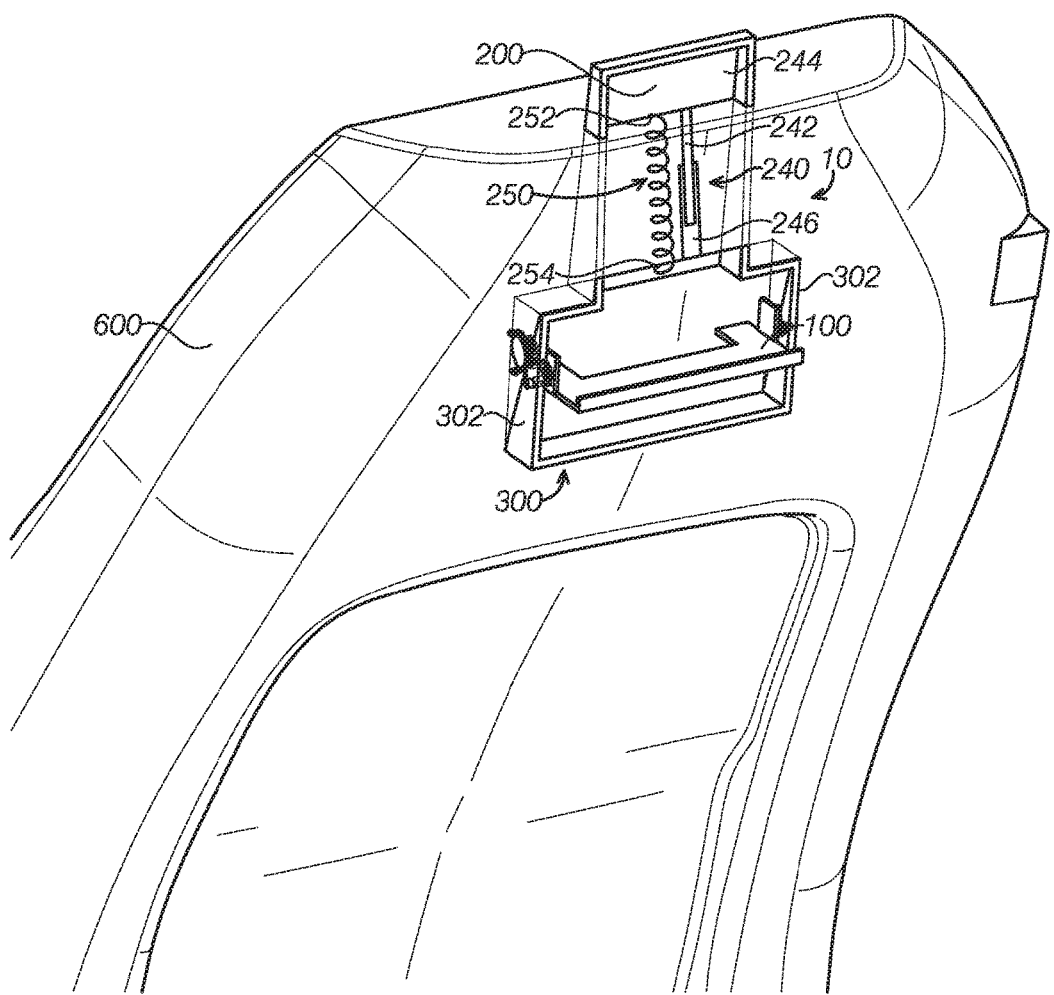
FIG. 3 is a perspective schematic view of the electronic device holder, showing the location of the base with the seat back.

Turning now to FIG. 3, a see-through perspective view of the device holder 10 is shown. In the illustrated embodiment, the device holder 10 includes a base 300. The folding shelf 100 is rotatably connected to the base 300 and sliding member 200 is slidably connected to the base 300. The base 300 may include two side walls 302 that are substantially parallel to the direction of travel of the sliding member 200. The base 300 is attached to the sidewalls 302 via any appropriate mechanism that enables rotation of the folding shelf 100. In the illustrated embodiment, the base 300 is a part of the seat structure associated with the seat 600. In some embodiments, the base 300 is a part of the trim of the seat structure. For example, the base 300 may be a metal part integrated with the trim of the seat structure. The device holder 10 may be built into the seat 600. In other embodiments, the device holder may be separate from the seat 600 and may include an attachment mechanism to attach the device holder to the seat back 600. The attachment mechanism includes but is not limited to a screw connection, a snap fitting and an adhesive connection.

FIG. 3 further shows an example mechanism in which the sliding member 200 is connected to the base 300. The device holder 10 may include a telescopic pole 240 having a first part 242 connected to an end portion 244 of the sliding member 200 and a second part 246 connected to the base 300. The first part 242 may move inside the second part 244 so that the sliding member 200 may be extended and retracted to vary a length of the sliding member 200. The device holder 10 may further include a spring 250 having a first end 252 connected to the end portion 244 and a second end 254 connected to the base 300. To set up an electronic device to the device holder 10, a user may unfold the folding shelf 100, place a bottom of the electronic device against one retaining lip, and then pull up an upper flange of the sliding member 300 to cover a top edge of the electronic device. The spring 250 applies a force to secure electronic device. When the user moves the upper flange away from electronic device, the sliding member 200 automatically retracts to the stowed position or a retracted position. It should be appreciated that any suitable mechanism may be used to retract the sliding member 200 automatically.

Figure 4:
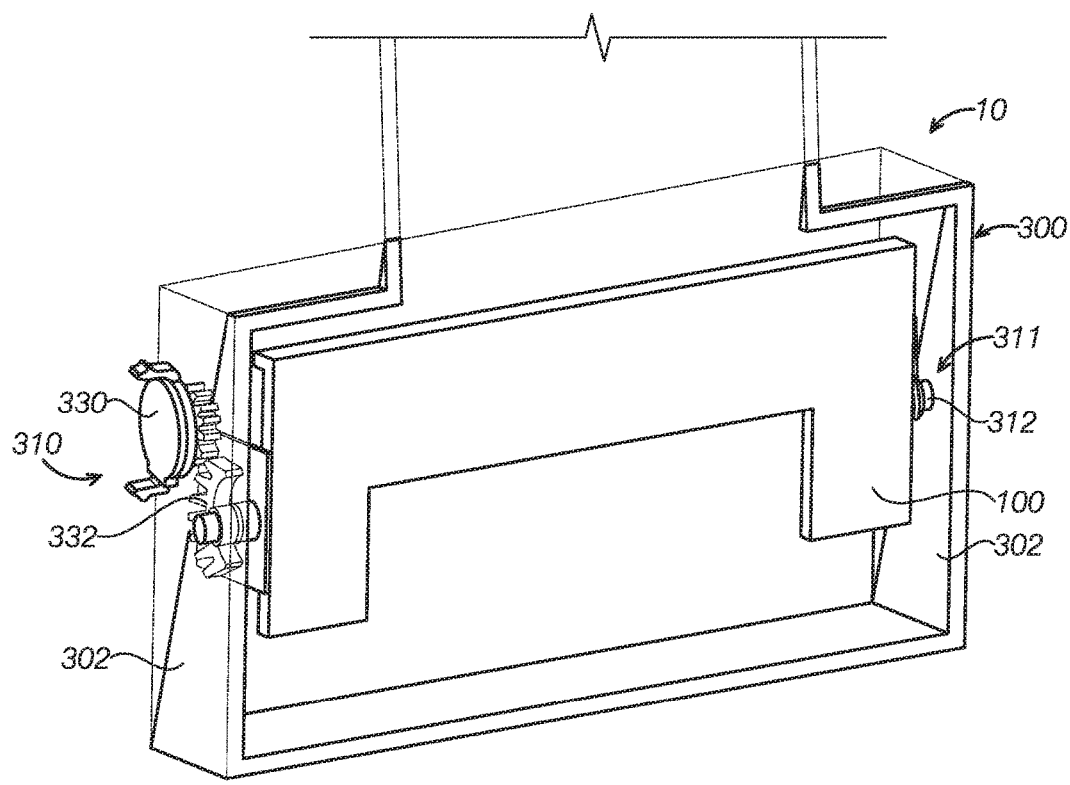
FIG. 4 is a perspective view of the electronic device holder, schematically illustrating rotational connection between the base and the folding shelf and showing the folding shelf in a stowed position.

Turning now to FIG. 4, FIG. 4 is a perspective view of the electronic device holder 10, schematically illustrating an example rotational connection between the base 300 and the folding shelf 100. The folding shelf 100 is shown in a stowed position. In some embodiments, the device holder 10 may include a first pivot member 310 and a second pivot member 311 which rotatably connects the folding shelf 100 to the base 300. In some embodiments, the first pivot member 310 and the second pivot member may include a protrusion 312 and sidewalls 302 of the base 300 may include corresponding holes. The connection of the protrusion 312 and holes create a rotatable connection between the folding shelf 100 and the base 300 so that the folding shelf 100 can be rotated up and down. In some embodiments, the first pivot member 310 may include damp gears having a first gear 332 coupled to the folding shelf 100 and a second gear 330 connected to the base 300. The first and second gears 330, 332 may engage with each other to provide an amount of resistance to damp the motion of the folding shelf 100 when it is rotated by a user. Further, the first and second gears 330, 332 may be configured to cause the folding shelf 100 to be folded down at a predetermined position. For example, the folding shelf 100 may be in a position substantially parallel to a floor where the seat is located.

Figure 5:
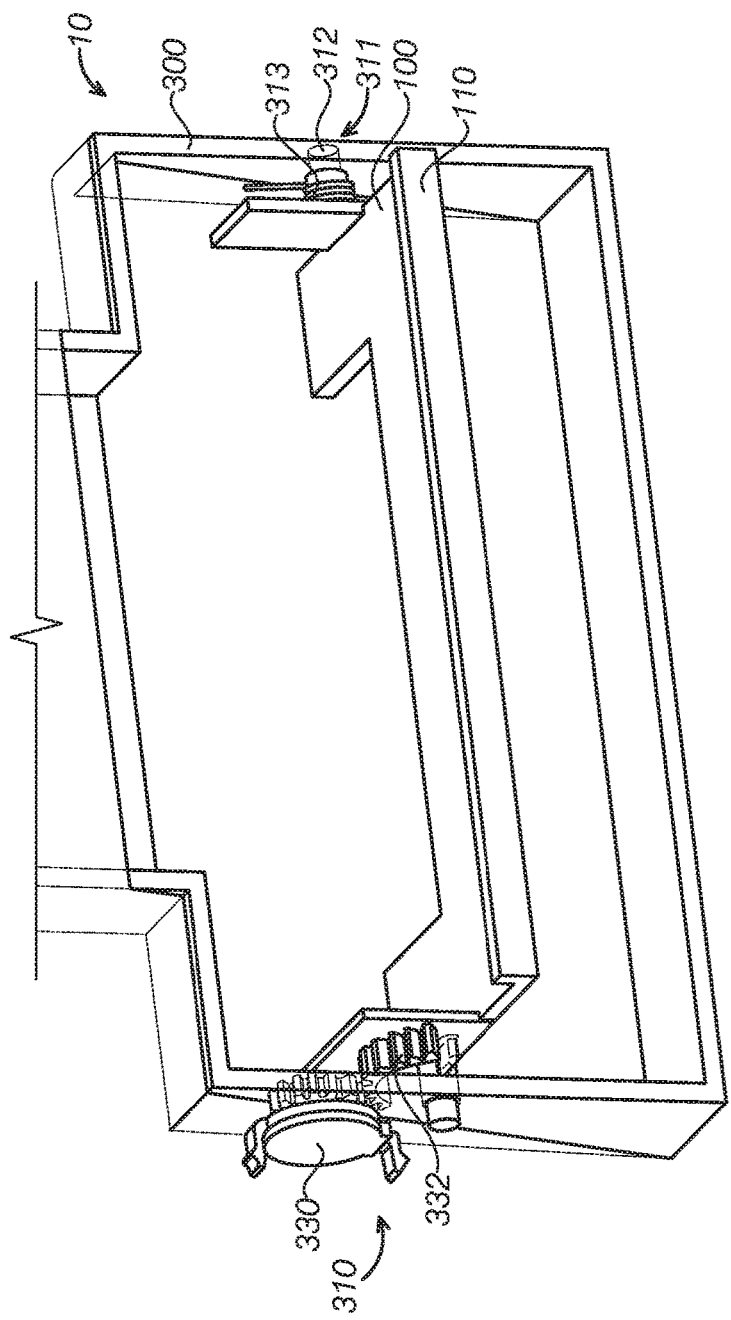
FIG. 5 is a detailed perspective view of the electronic device holder, schematically illustrating rotational connection between a base and the folding shelf and showing the folding shelf in a use position.

With further reference to FIG. 5, in some embodiments, the second pivot member 311 may include a spring 313 to bias the folding shelf 100 toward the use position. In some embodiments, the folding shelf 100 may automatically latch when the shelf is lifted to the stowed position, thereby storing energy in the spring 313. In some embodiments, the user may then deploy the folding shelf 100 by pressing on the underside of the folding shelf 100.

Turning now to FIGS. 6-7, a see-through perspective view of the rear of the device holder 10 is shown to illustrate a connection between the base 300 and sliding member 200 as well as a connection between the base 300 and folding shelf 100. FIG. 6 shows the sliding member 200 in a retracted position and FIG. 7 shows the sliding member 200 in an extended position. Another example mechanism to slidably connect the sliding member 200 to the base 300 is illustrated. As shown, the device holder 10 may include a rack gear 220 attached to the sliding member 200 and the pinion gear 222 attached to the base 300. The rack gear 220 may be moved up and down while engaging with the pinion gear 222. It should be appreciated that base may refer to a base fixed to the seat 600. In the depicted embodiment, the pinion gear 222 is attached to an upper portion of the base 300. In the stowed position shown in FIG. 6, a lower end 224 of the rack gear 220 is adjacent to a bottom wall 226 of the base 300. In the use position shown in FIG. 7, the lower end 224 is moved away from the bottom wall 226 so that the sliding member 200 is extended. In some embodiments, a force applied by the user moves the sliding member 200 upward or downward while the rack gear 220 and pinion gear are engaged. The sliding member 200 stops moving and is secured at a specific position once the force is released. In this way, the sliding member 200 may provide a plurality of fixed lengths in the use position to adapt the size of the electronic device and adjust the viewing angle.

Figure 8:
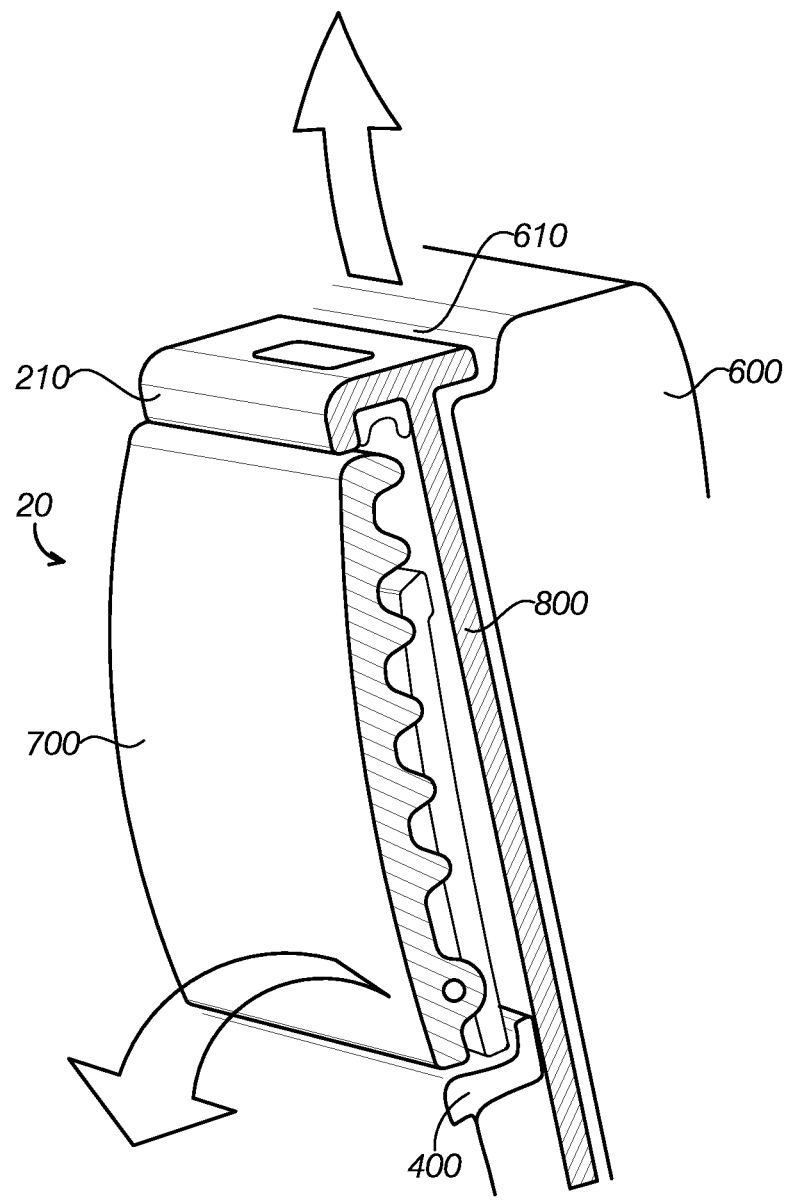
FIG. 8 is a perspective view of an electronic device holder according to another embodiment of the present disclosure.
Figure 9:
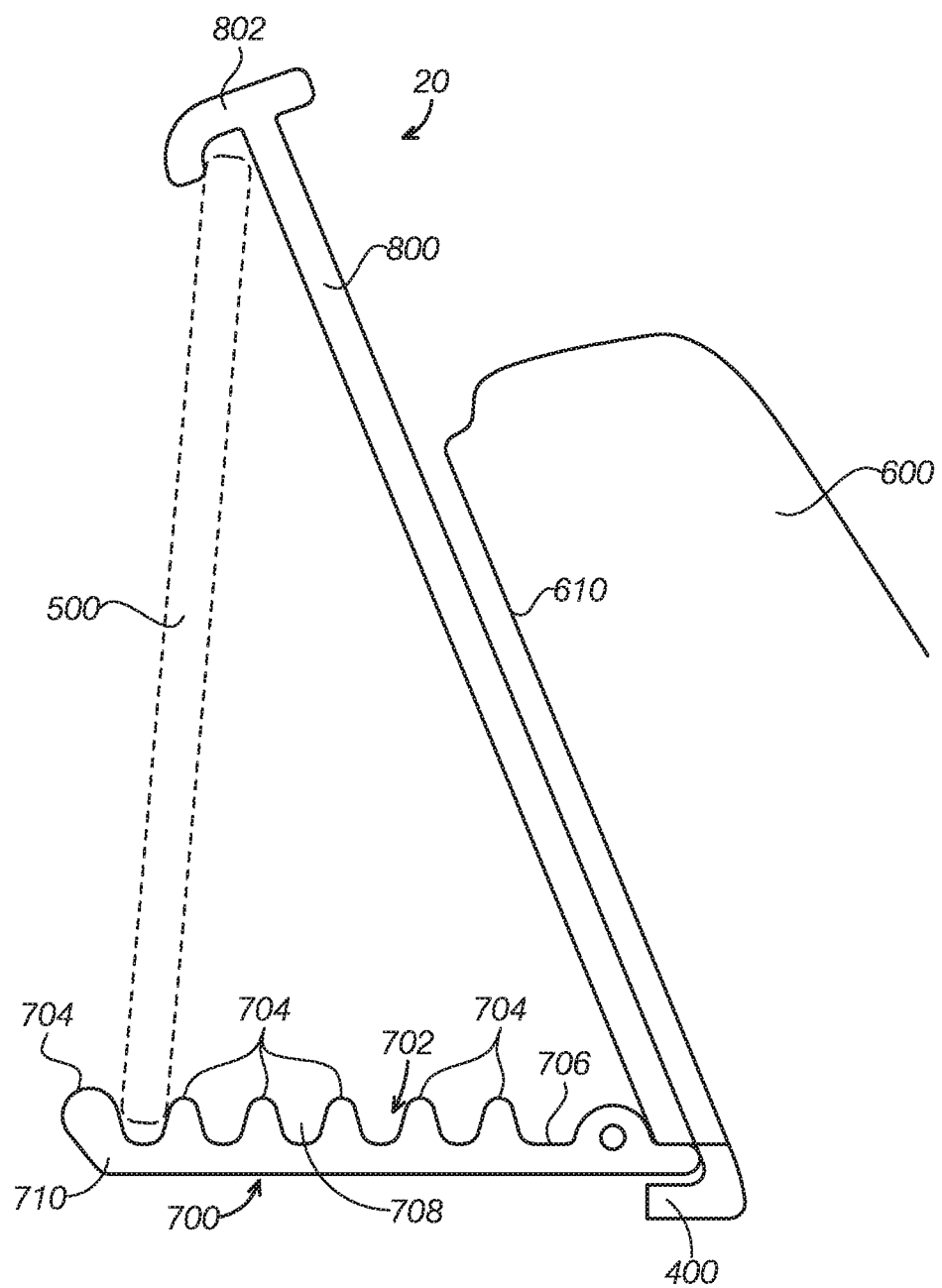
FIG. 9 is a side view of the electronic device holder in FIG. 8.

Turning now to FIGS. 8-9, FIG. 8 shows a perspective view of a device holder 20 according to another embodiment of the present disclosure, and FIG. 9 show a side view of device holder 20. FIG. 8 shows the device holder 20 is attached to the seat back 610 of the seat 600. In some embodiments, the device holder 20 may be integrated with the seat structure as described above. In some embodiments, the device holder 20 may be an after-market device and separately formed from the trim of the seat structure. The device holder 20 may include a base 400 attached to the seat back 610 of the seat 600. The base 400 may be attached to the seat back 610 by any appropriate attaching mechanisms. For example, the base 400 may be connected to a seat structure via a screw connection, a snap a fitting or adhesive connection. The device holder 20 may further include a folding shelf 700 rotatably connected to the base 400. The folding shelf 700 may be rotatably connected to the base 400 using any appropriate mechanism such as a push/push damped mechanism described above with reference to FIGS. 3-7.

The folding shelf 700 may have a corrugated surface 702. In some embodiments, the upper surface of the folding shelf 700 may comprise a non-slip material. In the depicted embodiments, the folding shelf 700 may include a plurality of retaining lips 704 extending from an upper surface 706 of the shelf. The plurality of retaining lips 704 form a plurality of recesses 708. In the depicted embodiments, the plurality of retaining lips 704 is located at a portion adjacent to a free end 710 of the folding shelf 700. A lower edge of the device 500 may be placed against one of the retaining lips 704 and into one of the recesses 708 in order to secure the lower edge of the device. A user may adjust a viewing angle of the device 500 by placing the lower edge of device 500 into different recesses 708. FIG. 9 shows that the lower edge is placed into a recess 708 adjacent to the free end 710.

The sliding member 800 can further adjust the viewing angle in addition to accommodate the size of device to be held. The sliding member 800 may be slidably connected to the base 400 in any appropriate mechanism. For example, the device holder 20 may include a telescopic pole and spring which are connected to the sliding member 800 and base 400 as described above with reference to FIG. 3. FIG. 9 further shows that the sliding member 800 is in an extended position. After the user places lower edge of the device 500 into one of recesses, the user may pull up the sliding member 800 and move an upper flange 802 over an upper edge of the device 500. A spring force will apply a force to secure the device 500 when the force by the user is released. The sliding member 800 can retract automatically to a retracted position or a stowed position once the user moves upper edge of the device 500 from the upper flange 802. In another example, the device holder 20 may include a rack gear and pinion gear that provide a slidable connection between sliding member 800 and base 400. Sliding member 800 may be pulled up and secured in a plurality of positions. Once the sliding member 800 is in a specific position and the folding shelf 700 is folded down, the user can place the lower edge into one recess on folding shelf 700 and place upper flange 802 over the upper edge of the device 500.

In the embodiment depicted in FIG. 8, at the stowed position, a surface of the upper flange 210 is substantially parallel to a top of the seat back. Further, a free end 710 of folding shelf 100 contacts the upper flange 210.

As described above, the user may select which retaining lip/recess to use in order to adjust the viewing angle and/or size of the device 500. The user may further adjust the extended length of the sliding member to accommodate the size of the device 500.

Figure 10:
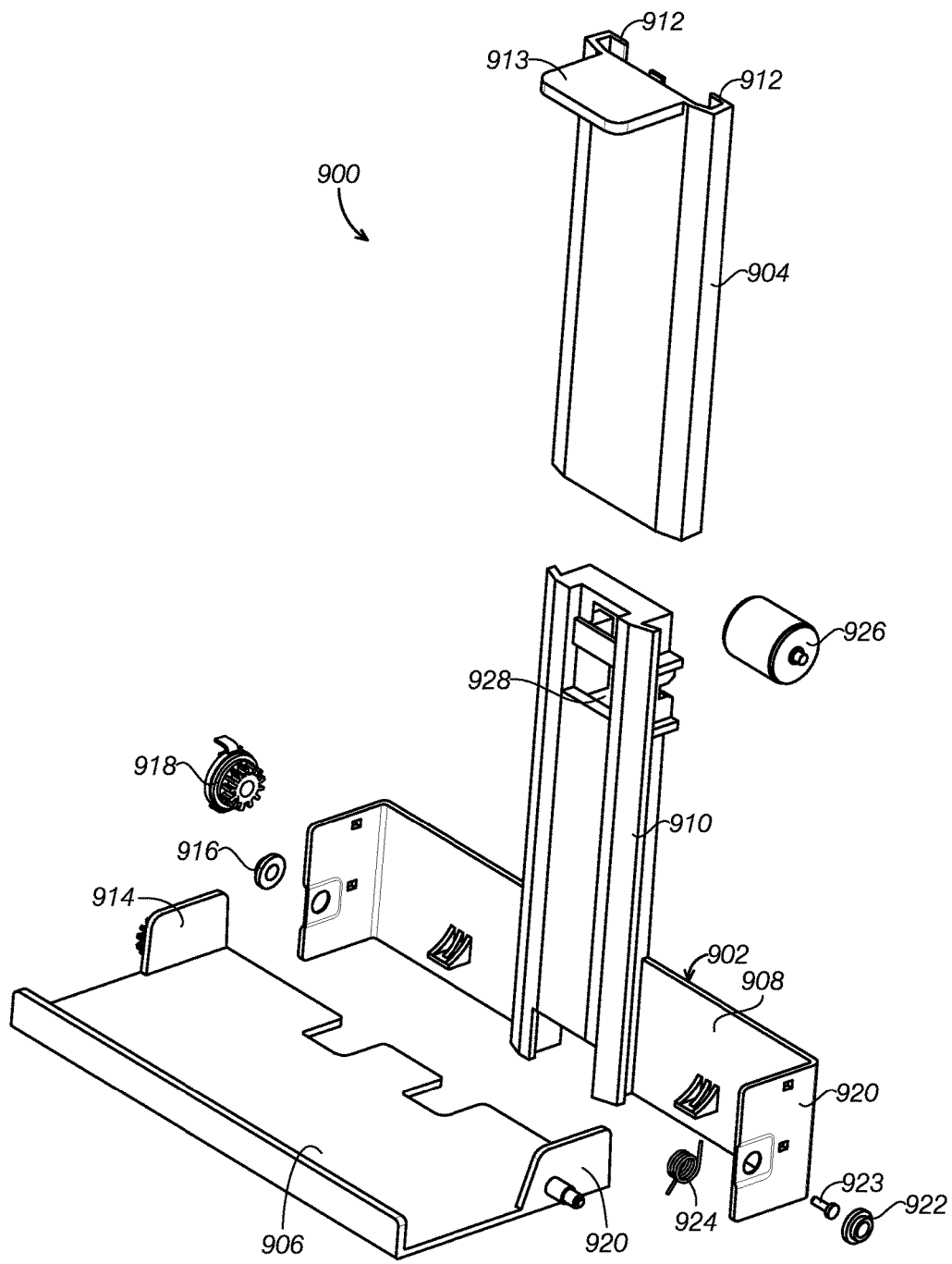
FIG. 10 shows an exploded view of an electronic device holder according to another embodiment of the present disclosure.

FIG. 10 shows an exploded view of another embodiment of an electronic device holder 900 according to the present disclosure. Hereinafter, the descriptions to the same elements as in the embodiments illustrated in previous figures will be omitted or mentioned briefly for the sake of brevity. In other words, differences between the present embodiment and the embodiment of FIGS. 1-9 will be mainly described. The device holder 900 may include a base 902, a sliding member 904 and a folding shelf 906. The base 902 may include a main body 908 and a rail 910. The sliding member 904 may include edge portions 912 or sliding grooves partially surrounding the rail 910 so that the sliding member 904 can slide along the rail 910. Sliding member 904 may further include an upper flange 913 which is used to hold a top edge of an electronic device. The upper flange 913 may extend from a main surface of the sliding member.

The folding shelf 906 may be connected to the base 902 via any suitable mechanisms that allow the folding shelf 906 to fold up toward the base 902 and deploy to a specific position. In some embodiments, one end 914 of the folding shelf 906 may be rotatably connected to main body 908 via a bushing 916 and a damp gear 918. Another end 920 of the folding shelf 906 may be rotatably connected to the main body 908 via a bushing 922, a retaining pin 923 and a spring 924. In some embodiments, the folding shelf 906 may have a corrugated surface as described above.

Figure 11:
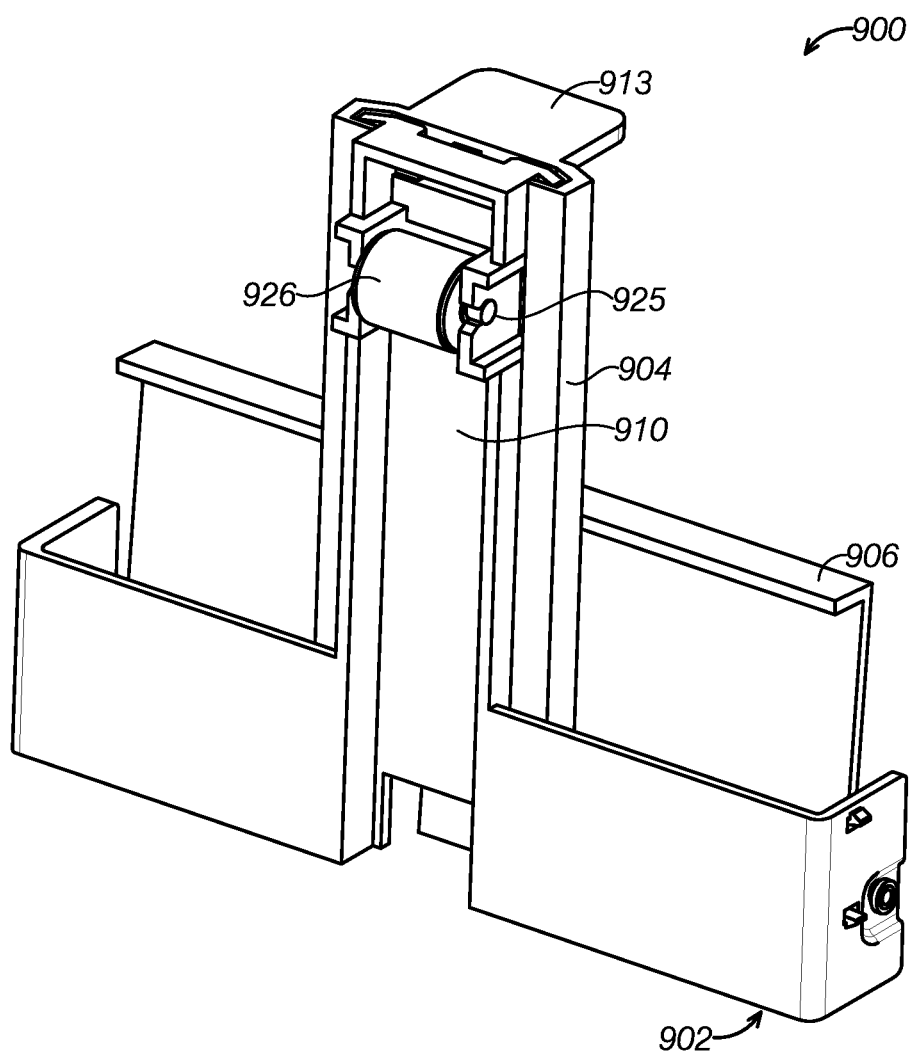
FIG. 11 shows a rear view of the electronic device in FIG. 10, illustrating a coil spring at an installed position.
Figure 12:
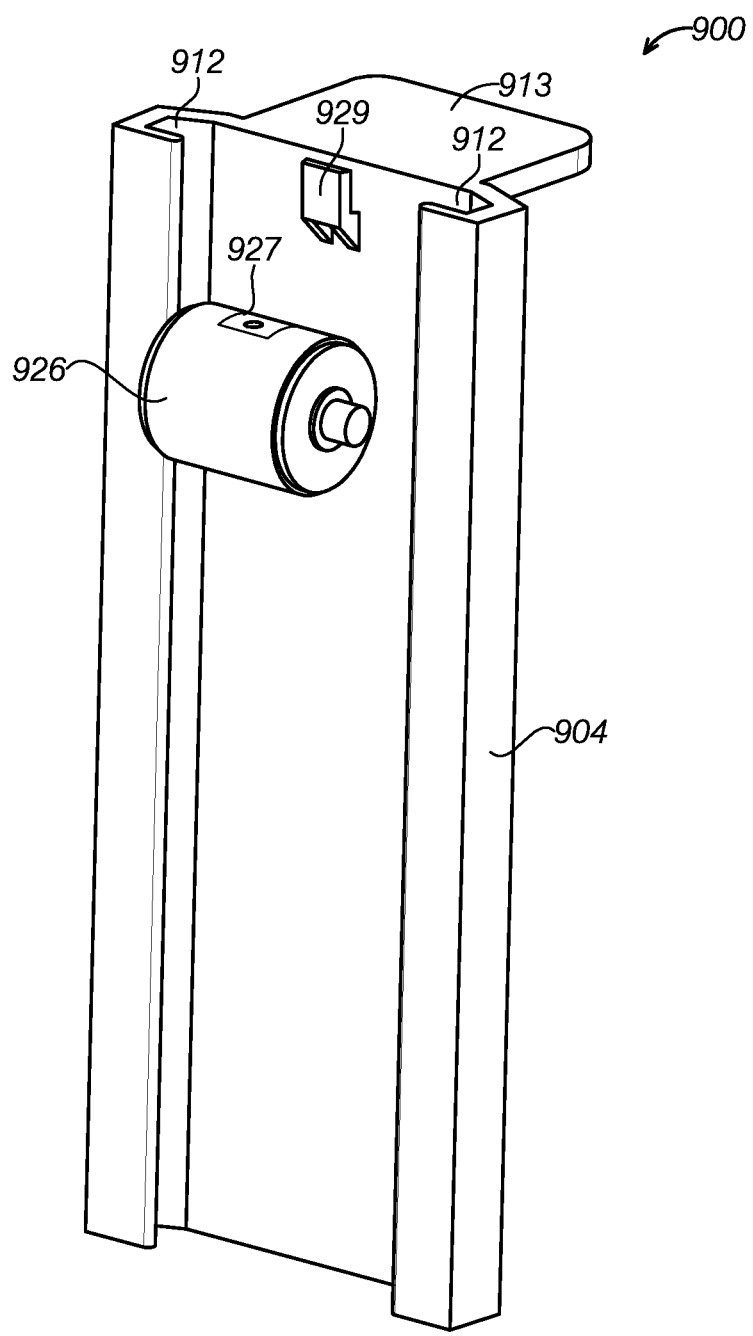
FIG. 12 shows an exploded view of the coil spring and a sliding member of the electronic device in FIG. 10.

The device holder 900 may further include a coil spring 926 received in an opening 928 of the rail 910. In the depicted embodiment, the coil spring 926 may be disposed adjacent to a top portion of the rail 910. Further referring FIGS. 11 and 12, FIG. 11 shows the coil spring 926 at an installed position and FIG. 12 shows an exploded view of the coil spring 926 and the sliding member 904. In some embodiments, one end 925 of the coil spring 926 is fixed to the rail 910 to provide a secured mounting point (see FIG. 11). As shown in FIG. 12, another end of the coil spring 926 may include a slot 927 (not shown) to receive a molded hook 929 on the sliding member 904 so that the coil spring 926 is connected to the sliding member 904. It should be appreciated that any suitable connecting mechanism may be used to connect the coil spring 926 with rail 910 and the sliding member 904, respectively. The coil spring 926 provides a level of tension that makes the upper flange 913 on the sliding member 904 have tendency to slide down to a retracted position, acting as a "clamp" on a top edge of the sliding member 904 and hold a lower edge of the folding shelf 906.

Figure 13:
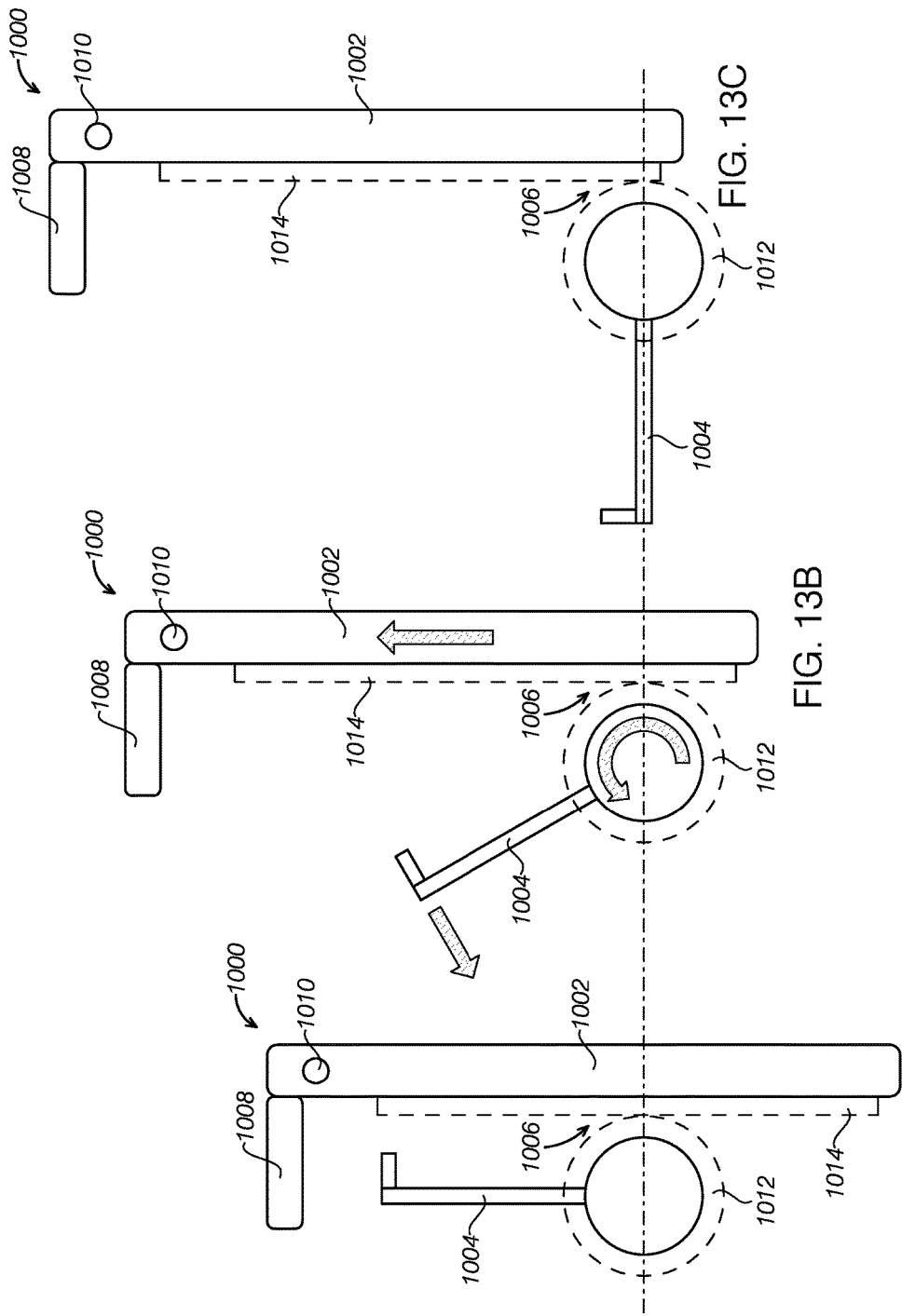
FIGS. 13A, 13B and 13C schematically illustrate an electronic device holder 1000 according to another embodiment the present disclosure.

FIGS. 13A, 13B and 13C schematically illustrate an electronic device holder 1000 according to another embodiment of the present disclosure. To simply the illustration, a base of device holder 1000 is not shown. As shown in FIGS. 13A, 13B and 13C, the device holder 1000 may include a sliding member 1002 and a folding shelf 1004 rotatably connected to the sliding member 1002 via a gear set 1006. The sliding member 1002 may include an upper flange 1008. A coil spring 1010 may be disposed in an opening in the sliding member 1002 and connected to the sliding member 1002 and the base, respectively. The gear set 1006 may include a gear 1012 attached the folding shelf 1004 and a rack gear 1014 attached to the sliding member 1002. FIG. 13A shows the folding shelf 1004 in a stowed position, FIG. 13C shows the folding shelf 1004 in a use position and FIG. 13B shows the folding shelf 1004 in a middle position between the use position and the stowed position. As the sliding member 1002 links to folding shelf 1004 via gear set 1006, the movement of the sliding member 1002 can cause the folding shelf 1004 to rotate from the stowed position to the use position or vice versa. For example, a user may insert a top edge of an electronic device under the upper flange 1008 to push the upper flange 1008 up or simply push the upper flange with one hand. As the user pushes up the sliding member 1002, the rack gear 1014 interacts with the gear 1012 to cause the gear 1012 to rotate. The rotation of the gear 1012 moves the folding shelf 1004 away from the sliding member 1002 as shown in FIG. 13B. Further pushing up of the upper flange 1008 can cause the folding shelf 1004 to be fully deployed or into the use position as shown in FIG. 13C. At the use position, the user can put a lower edge of the device into one of the recesses on a corrugated surface of the folding shelf 1004. The user can choose a recess that provides the best viewing angle and allows an adequate clamp load to be applied from the sliding member 1002.

Figure 14:
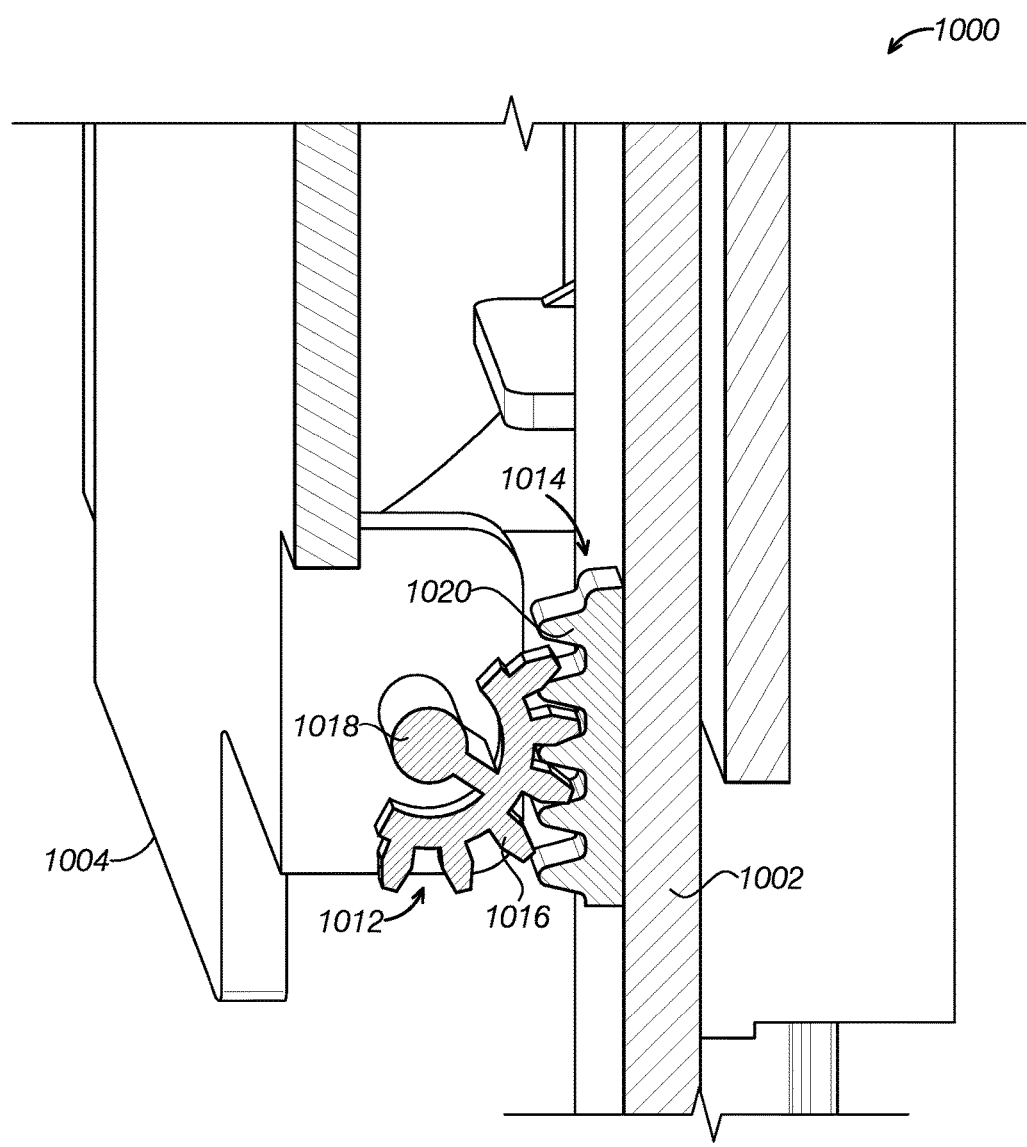
FIG. 14 is a partial cross-sectional view of device hold 1000 illustrated in FIG. 13A.

FIG. 14 is a partial cross-sectional view of the device hold 1000 illustrated in FIG. 13A. The folding shelf 1004 may be rotatably connected with first teeth 1016 of gear 1012 via a shaft 1018. FIG. 14 shows engagement of the teeth 1016 of the gear 1012 with teeth 1020 of the rack gear 1014 at a stowed position. As the sliding member 1002 moves up, the gear 1012 rotates counter-clockwise so as to cause the folding shelf 1004 to move away from the sliding member 1002. In the depicted embodiment, the gear 1012 has a semi-circle shape. In other embodiments, a main base of the gear 1012 may have a full circle with teeth arranged partially around the circle. The gear ratio of the gear set 1006 may be determined to enable the folding shelf 1004 to be fully deployed when the sliding member 1002 is positioned at a height required to hold a specific size of a device.

The disclosure above encompasses multiple distinct inventions with independent utility. While each of these inventions has been disclosed in a particular form, the specific embodiments disclosed and illustrated above are not to be considered in a limiting sense as numerous variations are possible. The subject matter of the inventions includes all novel and non-obvious combinations and subcombinations of the various elements, features, functions and/or properties disclosed above and inherent to those skilled in the art pertaining to such inventions. Where the disclosure or subsequently filed claims recite "a" element, "a first" element, or any such equivalent term, the disclosure or claims should be understood to incorporate one or more such elements, neither requiring nor excluding two or more such elements.

Applicant(s) reserves the right to submit claims directed to combinations and subcombinations of the disclosed inventions that are believed to be novel and non-obvious. Inventions embodied in other combinations and subcombinations of features, functions, elements and/or properties may be claimed through amendment of those claims or presentation of new claims in the present application or in a related application. Such amended or new claims, whether they are directed to the same invention or a different invention and whether they are different, broader, narrower or equal in scope to the original claims, are to be considered within the subject matter of the inventions described herein.

The invention claimed is:

1. An electronic device holder disposed on a seat back, comprising:
    a base fixed to the seat back;
    a folding shelf rotatably attached to the base via first and second pivot members and configured to be rotated between a stowed position and a use position, wherein the folding shelf includes an upper surface; and a plurality of retaining lips extending from the upper surface to form a plurality of recesses; and
    a sliding member attached to the base and configured to be moved upward and downward, wherein the folding shelf and the sliding member form an angle in the use position;
    a rack gear attached to the sliding member; and
    a pinion gear engaged with the rack gear and attached to the base;
    wherein a force applied by a user moves the sliding member upward and downward while the rack gear and the pinion gear are engaged, and wherein the sliding member is secured at a specific position when the force is released.

2. The electronic device holder of claim 1, wherein the sliding member includes an upper flange at a free end and extending from a main surface of the sliding member, wherein the base includes a main body having two sidewalls and a rail above the main body, wherein the folding shelf is attached to the two sidewalls of the base, respectively, and wherein the sliding member is configured to move along the rail.

3. The electronic device holder of claim 1, wherein the first pivot member includes two gears that engage with each other to provide an amount of resistance to damp motion of the folding shelf, and the second pivot member includes a pin and a spring.

4. The electronic device holder of claim 1, further comprising a latch configured to selectively prevent rotation of the pinion gear.

5. The electronic device holder of claim 1, wherein the base includes a main body and a rail disposed above the main body, wherein the main body includes two sidewalls substantially parallel to a length-wise direction of the sliding member and the folding shelf is attached to the two sidewalls, respectively, wherein the sliding member includes an upper flange extending from a surface of the sliding member at a free end and sliding grooves at two side of the sliding member, and wherein the sliding grooves surround the rail to guide the sliding member to move along the rail.

6. The electronic device holder of claim 1, wherein the base is a part of a seat structure associated with the seat back.

7. The electronic device holder of claim 1, further comprising an attachment mechanism configured to attach the electronic device holder to the seat back.

8. The electronic device holder of claim 1, wherein the folding shelf is made of non-slip material.

9. A seat assembly comprising:
- a seat having a seat back;
- a base attached to the seat back, wherein the base includes a main body having two sidewalls substantially perpendicular to a back surface of the seat and substantially in an upright position and a rail above the main body;
- a folding shelf rotatably attached to the sidewalls of the base via a first pivot member and a second pivot member such that the folding shelf is capable of up to a stowed position and down to a use position, wherein the folding shelf includes an upper surface and a plurality of retaining lips extending from the upper surface to form a plurality of recesses; and
- a sliding member including an upper flange extending from a main surface of the sliding member at a free end and slidably attached to the base, and wherein the sliding member and the folding shelf form an angle at the use position so as to hold an electronic device between one of the recesses and a free end of the sliding member in the use position,
- a rack gear attached to the sliding member; and
- a pinion gear rotatably engaged with the rack gear and attached to the base, wherein the rack gear is movable up and down with the sliding member.

10. The electronic device of claim 9, further comprising a coil spring attached to the rail and the sliding member, wherein the coil spring is disposed adjacent to a top end of the rail and configured to provide a tension to move the sliding member downward.

11. The seat assembly of claim 9, further comprising a damped gear mechanism engaged with the first pivot member.

12. The seat assembly of claim 9, wherein the base is a part of a trim of a seat structure.

13. The seat assembly of claim 9, wherein at the stowed position, the upper flange is substantially parallel to a top of the seat back and a free end of the folding shelf contacts the upper flange.

14. An electronic device holder disposed on a seat back, comprising:
- a base fixed to the seat back;
- a folding shelf rotatably attached to the base and configured to be rotated between a stowed position and a use position; and
- a sliding member attached to the base and configured to be moved upward and downward, wherein the folding shelf and the sliding member form an angle in the use position;
- a gear; and
- a rack gear engaging the gear;
- wherein the gear is attached to the folding shelf and the rack gear is attached to the sliding member, and wherein movement of the sliding member causes rotation of the folding shelf such that the folding shelf is placed in the use position or the stowed position.

15. The electronic device holder of claim 14, wherein the base is a part of a seat structure associated with the seat back.

16. The electronic device holder of claim 14, further comprising an attachment mechanism configured to attach the electronic device holder to the seat back.

17. The electronic device holder of claim 14, wherein the folding shelf is made of non-slip material.

18. The electronic device holder of claim 14, wherein the folding shelf includes an upper surface, and a plurality of retaining lips extending from the upper surface to form a plurality of recesses.

* * * * *